United States Patent Office 3,478,641
Patented Nov. 18, 1969

3,478,641
ANCHOR OR ROOF BOLTS AND THE LIKE
Hans O. Dohmeier, 30 van der Merwe St., Hillbrow
Johannesburg, Transvaal, Republic of South Africa
Filed Feb. 5, 1968, Ser. No. 702,931
Claims priority, application Republic of South Africa,
Feb. 7, 1967, 67/713
Int. Cl. F16b 13/04
U.S. Cl. 85—79    1 Claim

ABSTRACT OF THE DISCLOSURE

An anchoring device comprising a looped flexible cable having a head means secured to each end with cooperating inclined surfaces to allow radial movement for locking in position.

---

The present invention relates to improvements in anchor or roof bolts and the like which are used as supports in or from a rock face.

Hereinafter the use of the term "anchor bolt" includes anchor bolts, roof bolts or cable anchors and the term "shank" will include the rigid shank of a bolt or a cable.

Anchor bolts in the past have been made in many types and in general the attachment of the expansion unit to the shank has required machining operations or at least a special formation of the shank. The difficulty with regard to flexible shanked eye bolts has been even greater because the simple screwthread usually provided and used also to effect expansion of the unit cannot be made on the cable. Thus a solid end of some form has had to be welded or otherwise to the end of the cable and this is not an easily accomplished operation.

It is the object of the present invention to provide an anchor bolt with an expansion unit simply attached thereto in a manner applicable to both solid and cable shanked bolts.

Anchor bolts all have expansion units which are usually located on the free end of the bolt shank which is adapted to be inserted in a hole drilled in the rock to receive the bolt. The other or outer end of the bolt generally includes means whereby the expansion unit can be brought into its operative position to fix the bolt in position while tension is applied thereto.

According to this invention there is provided an anchor bolt which includes at least one part of the expansion unit cramped or swaged onto the shank of the bolt.

Further features of this invention provide for the cramped-on portion of the expansion unit to include one of the rock engaging surfaces of the unit and for there to be more than one such unit on the shank.

The invention also provides for the part of the unit cramped on the shank to have a tapered surface adapted to co-act with a separate complementarily shaped tapered rock engaging dog.

Still further features of the invention provide for the end of the shank, in the case where the shank is a cable, opposite the head to have a dog cramped thereon, the dog being adapted to co-act with the head to obtain an anchorage in a hole drilled in the rock face.

A preferred embodiment of this invention will be described as applied to the anchoring expansion unit for a cable shank eye-bolt. This is illustrated in the accompanying drawings in which.

Figure 3:
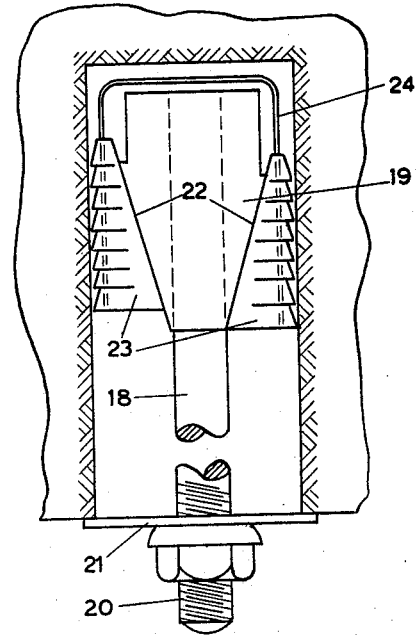

FIG. 3 an alternative expansion unit on a solid shank, and

Figure 4:
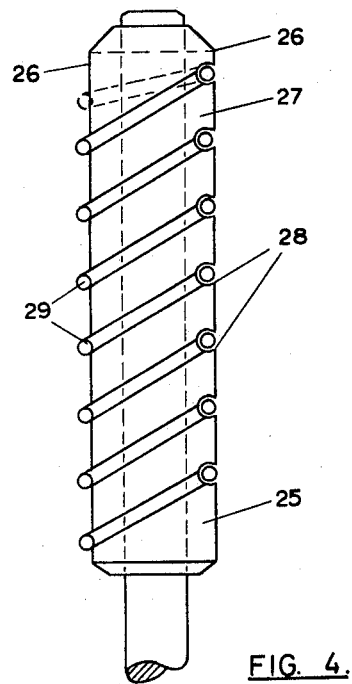

FIG. 4 an arrangement using a different type of locking dog assembly.

Figure 1:
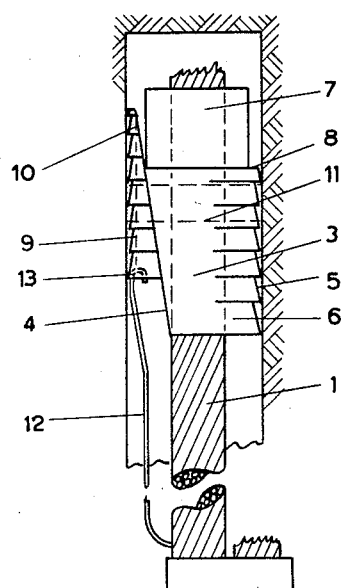
FIG. 1 shows the shank and one form of expansion unit.

As shown in FIG. 1 the eyebolt has a cable shank 1 having an eye 2 made in any convenient manner at the outer end. The other end has the head 3 of an expansion unit cramped or swaged thereon. This head is preferably made of cast malleable iron and has a single flat tapered surface 4 which tapers inwardly towards the outer end of the shank, and also the head 3 has serrations 5 formed on the rock engaging portion 6 thereof.

In this embodiment the cast head 3 has a collar 7 which is cramped onto the shank 1 while the rock engaging portion 6 tapered surface 4 and serrations 5 are not effected by the cramping operation. The cramping operation is preferably effected cold in an hydraulic press provided with jaws to meet this particular requirement.

The step 8 at the collar 7 facilitates location of the latter in the jaws of the press.

In use a complementary shaped dog 9 which is cast in the same material is placed with its tapered surface 10 on the tapered surface 4 of the head 3 and an elastic band 11 shown in dotted lines is placed around the assembly to retain the dog 9 in position while it is inserted in a hole drilled in a rock face. Once the anchor bolt has been inserted into such a hole the shank 1 is drawn up by applying tension thereto in the normal way to cause expansion and anchoring of the head and dog assembly. Some means may be necessary to cause the dog 9 to make an initial grip with the rock wall of the hole and this may be done by tapping the dog inwardly into the hole with a rod in known manner. Preferably a length of wire 12 is provided and extends along the majority of the length of the shank 1. This wire 12 may be secured to the dog through the hole 13 and enables the dog to be held in position until the initial expansion of the unit has been effected to enable the dog 9 and rock engaging surface on the head 3 to firmly grip the rock.

It has been found, particularly where cable eye bolts are concerned, that these bolts are not easily recoverable when both the rock engaging surfaces on the head and the dog have serrations formed therein. Thus the rock engaging surface on the head may be made without any serrations. This enables the cable and head to be released from the drill hole in which it had been anchored for further use elsewhere. Frequently the dog is not recovered or is recovered in a condition which makes it unfit for re-use. In such cases a new dog may be used with the recovered head.

Figure 2:
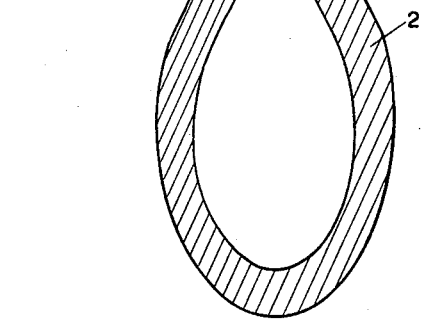
FIG. 2 shows a cable anchor also within the scope of this invention.

An alternative embodiment is illustrated in FIG. 2.

In this embodiment of the invention a cable shank 14 has a head 15 similar to that described above cramped or swaged on at each end but in an opposite relationship.

In use the cable is bent through 180 degrees and the two tapered surfaces 16 are placed in contact with each other and retained with a resilient band 17 or the like as described above. The assembly is then inserted into a hole drilled, for example, in a hanging wall in a mine and one or another half of the cable is tensioned thus causing frictional engagement in the rock face and anchoring of the cable to have an outwardly projecting loop.

The embodiment of the invention shown in FIG. 3 shows the shank 18 as a rigid rod with a head 19 cramped or swaged on one end having a screw thread 20 at the other. The screwthreaded end is fitted with a conventional type of backing plate, spherical seating washer and nut assembly 21. The head 19 cramped onto the sank 18 in this case is a conical head with a pair of oppositely disposed tapered surfaces 22 co-operating with a pair of dogs 23 which are connected and outwardly biased by a brindle 24.

It will be appreciated that there are many variations which may be made to the above. For example similar heads may be provided on each end of a cable to co-operate with separate dogs. In this case the cable may be used as a supporting slug with each end anchored in a different drill hole in the rock.

In yet another embodiment of the invention a head similar to those described above is cramped or swaged onto and around both the adjacent ends of a doubled over length of cable, the taper in this case sloping inwardly towards the eye formed by the cable. Thus both the ends of the cable in this embodiment are held by the one head, and an independent complementarily shaped dog is provided to co-act therewith in use.

A further form of the invention as shown in FIG. 4 provides for the head 25 to be of square cross-section but with rounded off corners 26 with one side 27 of the square of V-shape with the apex of the V outermost from the shank of the anchor bolt. In this last mentioned side are a series of transverse U-shaped notches 28. A dog in the form of metal rings 29 are placed in these notches and the edges of the notches are peened over to prevent the rings from falling out. The rings are of such a size and shape that when the anchor bolt is inserted into a hole in a rock face and pulled to anchor same, the rings 29 swivel about the notches 28 to engage the rock. A suitable shape for these rings would be an ellipse and in this case the notch would be positioned at one end of the ring or axis thereof.

It will be understood that any dogs used to co-act with anchor bolts of this invention could be cast or die cast from a ferrous or non-ferrous material such as steel, hard rubber, plastic or the like. If desired the locking dogs may be made as suitable metal pressings and that the head formations, that is the tapered surface and serrations, may be formed in the head by using a special die to cramp the head onto the bolt shank.

It will be appreciated that anchor bolts made in accordance with this invention will be cheaper to manufacture than similar known anchor bolts at present available.

What I claim as new and desire to secure by Letters Patent is:

1. An anchor bolt including an expansion unit comprising a head and a cooperating dog and a length of cable looped over to provide two free ends wherein, said head has a first substantially semi-cylindrical part with at least one side thereof having a longitudinally tapered surface for mating cooperation with a like but oppositely tapered surface formed on the dog, said head having a second part fixed with respect to the first part, said first and second parts having an axial bore extending therethrough, one end of said length of cable extending through the axial bore in said first and second parts, said second part being swaged onto said one end of said length of cable to secure said head against movement relative to said one end of said length of cable when an axial force is applied thereto, and said dog comprising a member shaped substantially identically to said head and being similarly received on the other end of said length of cable but in oppositely disposed relation to said head.

References Cited

UNITED STATES PATENTS

| | | | |
|---|---|---|---|
| 2,970,444 | 2/1961 | Peter | 85—79 |
| 3,338,128 | 8/1967 | Taylor | 85—79 |
| 1,242,569 | 10/1917 | McDonald | 85—3 |
| 1,901,391 | 3/1933 | Forberg | 85—3 |
| 2,918,840 | 12/1959 | Roesler | 85—79 |
| 3,077,809 | 2/1963 | Harding et al. | 85—69 |
| 3,192,822 | 7/1965 | Genter | 85—79 |
| 3,216,306 | 11/1965 | Taylor | 85—79 |
| 3,221,590 | 12/1965 | Dickow | 85—76 |
| 3,342,097 | 9/1967 | Rocheleau | 85—79 |

FOREIGN PATENTS

| | | |
|---|---|---|
| 536,310 | 1/1957 | Canada. |
| 1,400,296 | 4/1965 | France. |
| 1,417,029 | 9/1965 | France. |
| 916,286 | 8/1954 | Germany. |
| 920,781 | 11/1954 | Germany. |
| 1,116,176 | 11/1961 | Germany. |
| 779,011 | 7/1957 | Great Britain. |
| 1,008,863 | 11/1965 | Great Britain. |

MARION PARSONS, JR., Primary Examiner